Patented Sept. 13, 1949

2,481,953

UNITED STATES PATENT OFFICE 2,481,953

CYANINE DYESTUFFS AND PROCESS OF MAKING SAME

George Schwarz, Williamstown, Mass., assignor to The Gevaert Company of America, Inc., Williamstown, Mass.

No Drawing. Application October 25, 1944, Serial No. 560,355

11 Claims. (Cl. 260—240)

This invention relates to a new class of dyestuffs and to the process of making same.

In my copending application for patent of the United States Serial No. 559,121, entitled "Color couplers for color photography," filed October 17, 1944, now abandoned, I have described new products of condensation of 2-aminopyridine with an ester or halide of a halogenoacetic acid, these products being believed to be constituted according to the formula

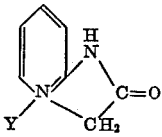

wherein Y is an anion, for instance halogen.

I have now found that these condensation products are capable of reacting with aromatic aldehydes under formation of dyestuffs believed to be constituted according to the general formula

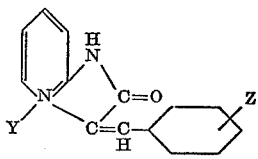

wherein Y is an anion, for instance halogen, and Z stands for one or several substituents, in any position of the benzene nucleus, selected from the group of radicals constituted by dialkylamino-; acetamino-; alkoxy-; nitro-; while, in addition to these auxochromic radicals, other substituents may be present, for instance halogen; alkyl; sulfuric acid, etc.

Of aromatic aldehydes to be used in the reaction the following may be specified by way of example: p- and m-nitrobenzaldehyde; salicylaldehyde; o-, m- and p-hydroxybenzaldehyde; piperomal (heliotropine); vanilline; veratraldehyde; 2 - chloro - 4 - hydroxybenzaldehyde; 5-chloro - 2 - hydroxybenzaldehyde; 2 hydroxy-3-methoxybenzaldehyde; O-methoxybenzaldehyde; 3-ethoxy-4-hydroxybenzaldehyde; anisaldehyde.

The styryl dyestuffs obtainable by condensing products of the constitution pointed out at the beginning with an aromatic aldehyde range from yellow to blue. These dyestuffs as well as the analogous azomethine dyestuffs obtainable by condensing the products of the constitution above disclosed with an aromatic nitroso compound have a very high tinctorial power. The dyestuffs of both these groups are soluble in water and in alcohol and can easily be obtained in a state of high purity. This makes them particularly adapted for incorporation in photographic emulsions and filters, quite especially filter layers in multilayer colorfilm or in antihalation layers. They are particularly valuable for these purposes, because their color disappears completely in the usual processing solutions and more especially in acid sulfite solutions. They also cover a wider spectral range than most of the dyestuffs hitherto used for these purposes.

As I already explained in my former patent application mentioned above, the starting product for the production of the new dyestuffs is obtained by heating a mixture of equimolar quantities of 2-aminopyridine and a halogenoacid ester such as ethylbromoacetate to start an exothermic reaction, adding some alcohol and refluxing the reaction mixture about 20 minutes, allowing it to cool and filtering and drying the precipitate at the pump. The product melts at 230–235 d.

Instead of ethylbromoacetate, the following reactants have been used with advantage: methylbromoacetate, chloroacetylchloride, bromoacetylbromide, ethyliodoacetate.

In the production of dyestuffs of the type here in view I may for instance proceed as follows:

*Example 1.*—Equimolar quantities of the condensation product, described above, of 2-aminopyridine with ethylbromoacetate and of p-dimethylaminobenzaldehyde were mixed together with some alcohol acting as solvent to prepare an approximately 10 per cent alcoholic solution, which was then filtered and dried.

The precipitate was a red dyestuff melting at about 260 with decomposition. Its solution in water absorbs in the green (430–580 $\mu\mu$) with a broad maximum at 520 $\mu\mu$, and is decolorized by sodium sulfite and bisulfite. The reaction is

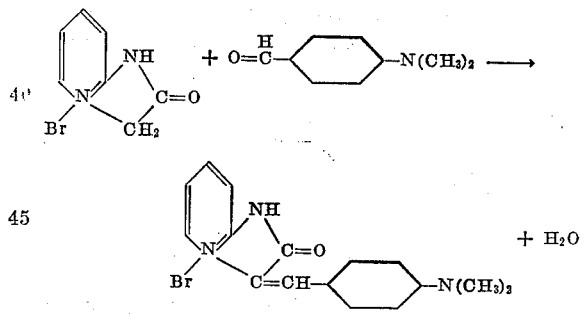

*Example 2.*—Equimolar quantities of the same starting product and p-diethylaminobenzaldehyde were mixed together with some alcohol acting as solvent to prepare an approximately 10 per cent alcoholic solution, which was refluxed 10 minutes. After cooling the reaction mixture was filtered and the precipitate washed with alcohol and dried. A red dyestuff was obtained, melting at 230 d., which is discolorized by sodium sulfite in aqueous solution. Its aqueous solution absorbed light within the range of 500 and 650 $\mu\mu$ with a very broad maximum at 590 μμ. The reaction is represented by the formulae

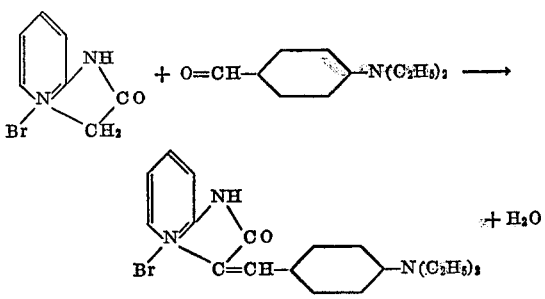

Example 3.—Equimolar quantities of the starting product used in the foregoing examples and salicylaldehyde were mixed together with some alcohol as a solvent to obtain an approximately 10% alcoholic solution which was then refluxed 10 minutes. Some alcohol was evaporated, the mixture was allowed to cool and the precipitate was separated by filtration and dried. A yellow dyestuff was obtained which melted at 220–225 d. Its solution turns red upon addition of alkali. The reaction is as follows

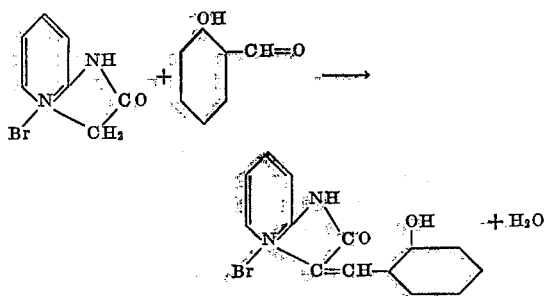

Example 4.—Equimolar quantities of the starting product used in Example 1 and vanillin were mixed together with three times their total weight of ethylalcohol and the mixture refluxed a few minutes, until it became a thick yellow mass. After 2 hours standing this mass was filtered, washed with a small amount of ethylalcohol and dried in vacuo. The product was an orange-yellow crystalline powder. Its solution in water absorbed all visible waves under 510 μμ. It has no definite melting point, but gradually decomposes at temperatures near 260° C. The solution is discolorized with sodium bisulfite and turns red on addition of some alkali. The reaction occurs as follows:

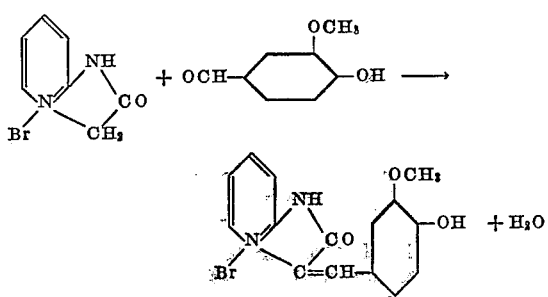

Example 5.—Equimolar quantities of the same starting product as mentioned in Example 1 and veratraldehyde were mixed together with three times their total weight of ethylalcohol and refluxed a few minutes, when the reaction mixture became a thicker yellow mass. After 2 hours' standing this mass was filtered, washed with a small amount of ethylalcohol and dried in vacuo.

The product was an orange-yellow crystalline powder. Its solution in water absorbed all visible light waves under 510 μμ. Melting point 242° C. With sodium sulfite the solution discolorizes. The reaction proceeds as follows

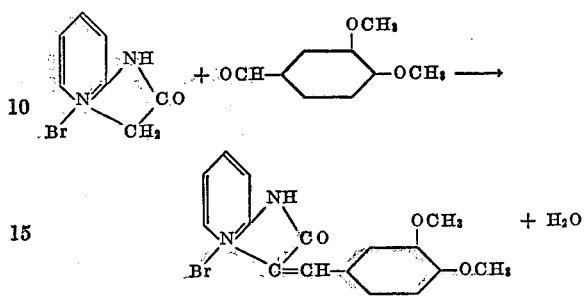

Various changes may be made in the foregoing description without departing from the invention or sacrificing the benefits thereof.

I claim:

1. The process of making a dyestuff which comprises condensing a quaternary cyclammonium salt, constituted according to the formula

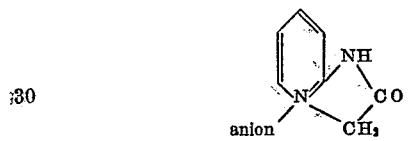

with an equimolar quantity of dialkylaminobenzaldehyde.

2. The process of making a dyestuff which comprises a condensing a quaternary cyclammonium salt, constituted according to the formula

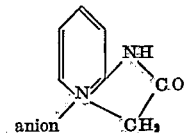

with an equimolar quantity of a dimethoxybenzaldehyde.

3. The process of making a dyestuff which comprises condensing a quaternary cyclammonium salt, constituted according to the formula

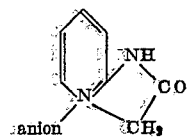

with an equimolar quantity of an hydroxy-alkoxybenzaldehyde.

4. As a new dyestuff, the compound constituted according to the formula

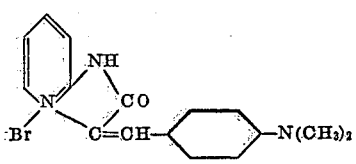

5. As a new dyestuff, the compound constituted according to the formula

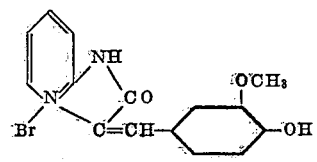

6. As a new dyestuff, the compound constituted according to the formula

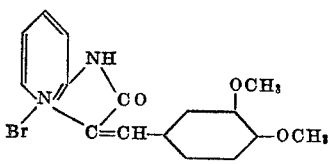

7. The process of producing dyestuffs which comprises condensing a quaternary cyclammonium salt constituted according to the formula

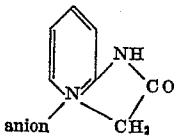

with a derivative of benzaldehyde substituted in the benzene nucleus by at least one radical selected from the group consisting of hydroxy, alkoxy and dialkylamino.

8. As new dyestuffs, the compounds constituted according to the general formula

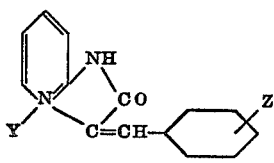

wherein Y is an anion and Z stands for at least one radical selected from the group consisting of hydroxy, alkoxy and dialkylamino.

9. As a new dyestuff, the compound constituted according to the formula

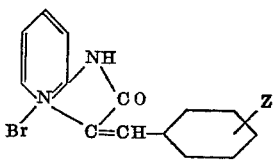

wherein Z stands for a dialkylamino group.

10. As a new dyestuff, the compound constituted according to the formula

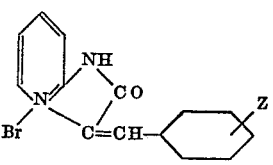

wherein Z stands for an hydroxy group.

11. As a new dyestuff, the compound constituted according to the formula

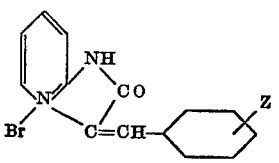

wherein Z stands for an alkoxy.

GEORGE SCHWARZ.

No references cited.